(12) United States Patent
Bender et al.

(10) Patent No.: US 9,531,731 B2
(45) Date of Patent: Dec. 27, 2016

(54) METHOD FOR ESTABLISHING A PLURALITY OF MODES OF OPERATION ON A MOBILE DEVICE

(71) Applicant: BlackBerry Limited, Waterloo (CA)

(72) Inventors: Christopher Lyle Bender, Kitchener (CA); Herbert Anthony Little, Waterloo (CA); Michael Kenneth Brown, Fergus (CA); Michael Stephen Brown, Kitchener (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/867,517

(22) Filed: Sep. 28, 2015

(65) Prior Publication Data

US 2016/0021119 A1 Jan. 21, 2016

Related U.S. Application Data

(63) Continuation of application No. 13/098,456, filed on Apr. 30, 2011, now Pat. No. 9,147,085.

(Continued)

(51) Int. Cl.
*G06F 21/12* (2013.01)
*H04W 12/08* (2009.01)
(Continued)

(52) U.S. Cl.
CPC .......... *H04L 63/105* (2013.01); *G06F 21/121* (2013.01); *G06F 21/629* (2013.01); *H04L 63/20* (2013.01);
(Continued)

(58) Field of Classification Search
CPC ...... G06F 21/121; G06F 21/53; G06F 21/629; G06F 21/60; G06F 21/62; G06F 21/105; G06F 21/74; G06F 21/606; G06F 2221/2149; H04L 63/102; H04L 63/104
(Continued)

(56) References Cited

U.S. PATENT DOCUMENTS 4,945,556 A 7/1990 Namekawa
5,864,765 A 1/1999 Barvesten
(Continued)

FOREIGN PATENT DOCUMENTS

CN 101523878 A 9/2009
EP 0973350 A1 1/2000
(Continued)

OTHER PUBLICATIONS

International Searching Authority, International Search Report on Application No. PCT/CA2011/001058, Issued on Dec. 21, 2011.
(Continued)

*Primary Examiner* — Eleni Shiferaw
*Assistant Examiner* — Nelson Giddins
(74) *Attorney, Agent, or Firm* — Moffat & Co.

(57) ABSTRACT

A method, device and system for establishing plural modes of operation on a mobile device, including: associating each application on the mobile device with one of a plurality of modes; and restricting access to data on the mobile device to only a subset of applications based on the mode associated for the each application. A system includes connection of an untrusted device to a trusted device and restricting data access for restricted data to a subset of trusted applications on the untrusted device.

20 Claims, 6 Drawing Sheets

Related U.S. Application Data

(60) Provisional application No. 61/386,270, filed on Sep. 24, 2010.

(51) Int. Cl.
*H04L 29/06* (2006.01)
*G06F 21/62* (2013.01)
*G06F 21/60* (2013.01)
*G06F 21/53* (2013.01)
*H04W 88/02* (2009.01)

(52) U.S. Cl.
CPC .............. *H04W 12/08* (2013.01); *G06F 21/53* (2013.01); *G06F 21/60* (2013.01); *H04W 88/02* (2013.01)

(58) Field of Classification Search
USPC .......................................................... 726/30
See application file for complete search history.

(56) References Cited

U.S. PATENT DOCUMENTS

| | | | |
|---|---|---|---|
| 5,987,440 A | 11/1999 | O'Neil et al. | |
| 5,987,611 A | 11/1999 | Freund | |
| 6,052,735 A | 4/2000 | Ulrich et al. | |
| 6,105,132 A | 8/2000 | Fritch et al. | |
| 6,233,446 B1 | 5/2001 | Do | |
| 6,292,798 B1 | 9/2001 | Dockter et al. | |
| 6,351,816 B1 | 2/2002 | Mueller et al. | |
| 6,360,322 B1 | 3/2002 | Grawrock | |
| 6,405,202 B1 | 6/2002 | Britton et al. | |
| 6,412,070 B1 | 6/2002 | Van Dyke et al. | |
| 6,516,421 B1 | 2/2003 | Peters | |
| 6,647,388 B2 | 11/2003 | Numao et al. | |
| 6,668,323 B1 | 12/2003 | Challener et al. | |
| 6,757,821 B1 | 6/2004 | Akiyama et al. | |
| 6,772,350 B1 | 8/2004 | Belani et al. | |
| 6,795,967 B1 | 9/2004 | Evans et al. | |
| 6,886,038 B1 | 4/2005 | Tabbara et al. | |
| 6,957,330 B1 | 10/2005 | Hughes | |
| 6,978,385 B1 | 12/2005 | Cheston et al. | |
| 7,246,374 B1 | 7/2007 | Simon et al. | |
| 7,331,058 B1 | 2/2008 | Gladney | |
| 7,373,657 B2 | 5/2008 | Walker | |
| 7,400,878 B2 | 7/2008 | Hassan et al. | |
| 7,555,723 B1 | 6/2009 | Coe | |
| 7,574,200 B2 | 8/2009 | Hassan et al. | |
| 7,694,328 B2 | 4/2010 | Joshi et al. | |
| 7,869,789 B2 | 1/2011 | Hassan et al. | |
| 7,917,963 B2 | 3/2011 | Goyal et al. | |
| 8,001,375 B2 | 8/2011 | Hattori et al. | |
| 8,005,507 B2 | 8/2011 | Celik | |
| 8,074,078 B2 | 12/2011 | Brown et al. | |
| 8,095,124 B2 | 1/2012 | Balia | |
| 8,204,480 B1 | 6/2012 | Lindteigen et al. | |
| 8,205,257 B1 | 6/2012 | Satish et al. | |
| 8,244,279 B2 | 8/2012 | Dicke et al. | |
| 8,275,356 B2 | 9/2012 | Hickie | |
| 8,370,929 B1 | 2/2013 | Pennington et al. | |
| 8,544,084 B2 | 9/2013 | Owen et al. | |
| 2001/0047485 A1 | 11/2001 | Brown et al. | |
| 2002/0013815 A1 | 1/2002 | Obradovich et al. | |
| 2002/0019944 A1 | 2/2002 | Kou | |
| 2002/0031230 A1 | 3/2002 | Sweet et al. | |
| 2002/0095414 A1 | 7/2002 | Barnett et al. | |
| 2002/0095497 A1 | 7/2002 | Satagopan et al. | |
| 2002/0112155 A1 | 8/2002 | Mertherus et al. | |
| 2003/0005317 A1 | 1/2003 | Audebert et al. | |
| 2003/0065676 A1 | 4/2003 | Gbadegesin et al. | |
| 2003/0093698 A1 | 5/2003 | Challener et al. | |
| 2003/0120948 A1 | 6/2003 | Schmidt et al. | |
| 2003/0126437 A1 | 7/2003 | Wheeler et al. | |
| 2003/0163685 A1 | 8/2003 | Paatero | |
| 2003/0177389 A1 | 9/2003 | Albert et al. | |
| 2004/0001101 A1 | 1/2004 | Trajkovic et al. | |
| 2004/0186809 A1* | 9/2004 | Schlesinger et al. | 705/50 |
| 2005/0154935 A1 | 7/2005 | Jin | |
| 2005/0210270 A1 | 9/2005 | Rohatgi et al. | |
| 2005/0213763 A1 | 9/2005 | Owen et al. | |
| 2005/0223239 A1 | 10/2005 | Dotan | |
| 2006/0059556 A1 | 3/2006 | Royer | |
| 2006/0070114 A1 | 3/2006 | Wood et al. | |
| 2006/0129948 A1 | 6/2006 | Hamzy et al. | |
| 2006/0156026 A1 | 7/2006 | Utin | |
| 2006/0212589 A1 | 9/2006 | Hayer et al. | |
| 2006/0253894 A1* | 11/2006 | Bookman et al. | 726/2 |
| 2006/0294102 A1 | 12/2006 | Reddish et al. | |
| 2007/0073694 A1 | 3/2007 | Picault et al. | |
| 2007/0186275 A1 | 8/2007 | Shahbazi | |
| 2007/0226778 A1 | 9/2007 | Pietruszka | |
| 2007/0277127 A1 | 11/2007 | Carlson et al. | |
| 2008/0081609 A1 | 4/2008 | Burgan et al. | |
| 2008/0104572 A1 | 5/2008 | Hernandez et al. | |
| 2008/0126740 A1* | 5/2008 | Wrighton et al. | 711/208 |
| 2008/0222711 A1 | 9/2008 | Michaelis et al. | |
| 2008/0254767 A1 | 10/2008 | Jin | |
| 2008/0282093 A1 | 11/2008 | Hatakeyama | |
| 2008/0318616 A1 | 12/2008 | Chipalkatti et al. | |
| 2009/0024992 A1 | 1/2009 | Kulaga et al. | |
| 2009/0049510 A1 | 2/2009 | Zhang et al. | |
| 2009/0049518 A1 | 2/2009 | Roman et al. | |
| 2009/0125683 A1* | 5/2009 | Okamoto et al. | 711/115 |
| 2009/0228494 A1* | 9/2009 | Beichter et al. | 707/10 |
| 2009/0254753 A1 | 10/2009 | De Atley et al. | |
| 2009/0271583 A1 | 10/2009 | Kershaw et al. | |
| 2010/0031325 A1 | 2/2010 | Maigne et al. | |
| 2010/0050244 A1 | 2/2010 | Tarkhanyan et al. | |
| 2010/0057911 A1 | 3/2010 | Soppet et al. | |
| 2010/0093379 A1 | 4/2010 | Neely et al. | |
| 2010/0175104 A1* | 7/2010 | Khalid | 726/1 |
| 2010/0241610 A1 | 9/2010 | Gibson et al. | |
| 2010/0274910 A1* | 10/2010 | Ghanaie-Sichanie et al. | 709/229 |
| 2010/0299376 A1 | 11/2010 | Batchu et al. | |
| 2010/0306528 A1 | 12/2010 | Andress et al. | |
| 2010/0319053 A1 | 12/2010 | Gharabally et al. | |
| 2011/0055917 A1* | 3/2011 | Wickstrom | 726/17 |
| 2011/0099643 A1 | 4/2011 | Harvey et al. | |
| 2011/0107437 A1* | 5/2011 | Goyal et al. | 726/30 |
| 2011/0145833 A1* | 6/2011 | De Los Reyes et al. | 718/106 |
| 2011/0167470 A1 | 7/2011 | Walker et al. | |
| 2011/0239125 A1* | 9/2011 | Kristensen et al. | 715/743 |
| 2011/0246566 A1 | 10/2011 | Kashef et al. | |
| 2011/0276806 A1 | 11/2011 | Casper et al. | |
| 2011/0277038 A1 | 11/2011 | Sahita et al. | |
| 2011/0314467 A1 | 12/2011 | Pearson | |
| 2012/0014321 A1 | 1/2012 | Schmitz | |
| 2012/0023573 A1 | 1/2012 | Shi | |
| 2012/0054853 A1* | 3/2012 | Gupta et al. | 726/17 |
| 2012/0079609 A1 | 3/2012 | Bender et al. | |
| 2012/0124640 A1 | 5/2012 | Bender et al. | |
| 2012/0131685 A1 | 5/2012 | Broch et al. | |
| 2012/0144196 A1 | 6/2012 | Owen et al. | |
| 2012/0202527 A1 | 8/2012 | Obradovich et al. | |
| 2012/0311282 A1 | 12/2012 | Cannon et al. | |
| 2013/0217378 A1* | 8/2013 | Danford et al. | 455/419 |
| 2013/0298185 A1 | 11/2013 | Koneru et al. | |
| 2013/0305058 A1 | 11/2013 | Kapoor et al. | |
| 2014/0108793 A1 | 4/2014 | Barton et al. | |
| 2014/0115709 A1 | 4/2014 | Gross et al. | |

FOREIGN PATENT DOCUMENTS

| | | |
|---|---|---|
| GB | 2408179 B | 5/2006 |
| WO | 0059225 A1 | 10/2000 |
| WO | 2005045550 A2 | 5/2005 |
| WO | 2009014975 A1 | 1/2009 |

OTHER PUBLICATIONS

International Preliminary Searching Authority, International Preliminary Report on Patentability, on Application No. PCT/CA2011/001058, Issued on Jan. 7, 2013.

(56) References Cited

OTHER PUBLICATIONS

Canadian Intellectual Property Office, Office Action on Application No. 2,814,852 , Issued on Dec. 9, 2014.
European Patent Office, Extended European Search Report on Application No. 12155659.1, Issued on Aug. 1, 2012.
European Patent Office, Extended European Search Report on Application No. 12153439.0, Issued on Jul. 13, 2012.
"Smartphone Security Beyond Lock and Wipe" : http://www.enterprisemobiletoday.com/features/security/article.php/3887006/Smartphone-Security-Beyond-Lock-and-Wipe.htm , Jun. 10, 2010.
"Basic Access Authentication" : http://en.wikipedia.org/wiki/Basic_access_authentication , Jan. 23, 2010.
"Digital Access Authentication": http://en.wikipedia.org/wiki/Digest_access_authentication , Dec. 23, 2009.
"Cross-site request forgery": http://en.wikipedia.org/wiki/Cross-site_request_forgery , Nov. 30, 2008.
Panu Korpipaa et al, "Customizing User Interaction in Smart Phones", Pervasive Computing, IEEE CS (2006) pp. 81-90 (URL: http://www.idi.ntnu.no/grupper/su/bibliography/pdf/2006/Korpipaa2006pc.pdf) , 2006.
Julian Seifert, "Supporting Mobile Privacy and Security through Sensor-Based Context Detection", Second International Workshop on Security and Privacy in Spontaneous Interaction and Mobile Phone Use, Finland (URL:http://www.medien.ifi.lmu.de/iwssi2010/papers/iwssi-spmu2010-seifert.pdf) , May 17, 2010.
Kay Yang et al, "EagleVision: A Pervasive Mobile Device Protection System", Iowa State Unviersity (URL: http://www.cs.iastate.edu/~wzhang/papers/eagleVision.pdf), Jul. 2009.
Aditi Gupta et al, "Using context-profiling to aid access control decisions in mobile devices", Nokia Research Center (URL: http://www.cerias.purdue.edu/assets/symposium/2011-posters/372-C48.pdf) , Apr. 5-6, 2011. Please refer to the 1-page file named 372-C48.pdf.
United States Patent and Trademark Office, Non-Final Office Action on U.S. Appl. No. 10/524,353 , Issued on Sep. 21, 2012.
International Search Report on International Application No. PCT/CA 03/01245, Issued on Dec. 23, 2003.
PCT Written Opinion on International Application No. PCT/CA 03/01245, Issued on Apr. 23, 2004.
PCT Written Opinion on International Application No. PCT/CA 03/01245, Issued on Sep. 20, 2004.
PCT International Preliminary Examination Report on International Application No. PCT/CA 03/01245, Issued on Nov. 29, 2004.
Canadian Intellectual Property Office, Office Action on Application No. 2,814,852, Issued on Dec. 16, 2015.
Canadian Intellectual Property Office, Office Action on Application No. 2,814,852, Issued on Dec. 9, 2014.
European Patent Office, Extended European Search Report on Application No. 11826252.6, Issued on Mar. 3, 2016.

* cited by examiner

METHOD FOR ESTABLISHING A PLURALITY OF MODES OF OPERATION ON A MOBILE DEVICE

RELATED APPLICATIONS

The present application is a continuation of U.S. patent application Ser. No. 13/098,456, filed Apr. 30, 2011, which claims priority from U.S. provisional application Ser. No. 61/386,270 filed on Sep. 24, 2010, the complete drawings and specification of all of which are incorporated herein by reference.

FIELD OF THE DISCLOSURE

The present disclosure relates to mobile devices and in particular to data and application security on computing devices.

BACKGROUND

Mobile devices are used for a variety of purposes. Users may wish to use the device for personal applications such as games, really simple syndication (RSS) reading, web browsing and general leisure. Corporations may want a device to be used for a subset of functionality required for a user to complete their job.

However, when a mobile device is used for both corporate and personal matters, a corporation may choose to limit the risk of exposure of data on the mobile device. This may be done, for example, through information technology (IT) policies with regard to the device. Such policies sometimes lead to a poor user experience for the device as the device is locked or restricted regarding which applications can be loaded onto the device. For example, an IT policy on the device may want to prevent potential viruses, and thus the user may be prohibited from downloading software from any location other than a specifically approved location. This limits the range of applications that the user can install.

BRIEF DESCRIPTION OF THE DRAWINGS

The present disclosure will be better understood with reference to the drawings in which.

DETAILED DESCRIPTION

The present disclosure provides for a method of establishing plural modes of operation on a mobile device, the method comprising: associating each application on the mobile device with one of a plurality of modes; and restricting access to data on the mobile device to only a subset of applications based on the mode associated with the application.

The present application further provides a mobile device configured for plural modes of operation, the mobile device comprising: a processor; and memory, wherein the processor and memory cooperate to: associate each application on the mobile device with one of a plurality of modes; and restrict access to data on the mobile device to only a subset of applications based on the mode associated with the application.

The present disclosure further provides a system comprising: a trusted device configured to receive restricted data, the trusted device having: a processor; memory; wherein the processor and memory cooperate to: associate each application on the trusted device with one of a plurality of modes; and restrict access to data on the trusted device to only a subset of applications based on the designated mode for the application; the trusted device further including server software; and an untrusted device, the untrusted device having: a processor; memory; wherein the untrusted device processor and memory cooperate to: associate a subset of applications on the untrusted device as associated with a trusted mode; the untrusted device further having a client capable of communicating with the server on the trusted device, wherein the client restricts access to the restricted data on the trusted device to the subset of applications on the untrusted device belonging to the trusted mode.

Rather than restricting access to an entire device that is used for both personal and corporate functionality, the present disclosure provides for the creation of a dual or plural mode of operations on the device. In particular, the present disclosure segregates applications into one of a plurality of groups. In the example of corporate and personal, applications can be designated as either corporate or personal applications. In some cases, where an application may be both corporate and personal, a copy of the application can be provided in both the personal space and the corporate space on the mobile device.

The present disclosure provides for a mobile device, but is not meant to be limited to any particular mobile device. Examples of mobile devices can include smart phones, personal digital assistants, data enabled cellular telephones, tablet computers, among others.

The mobile device in the present disclosure implements an information technology policy to control corporate data. This may be done by connection to an enterprise server, which provides for the IT policy for the device. In other embodiments, the IT policy may be implemented on a per device basis individually.

Figure 1:
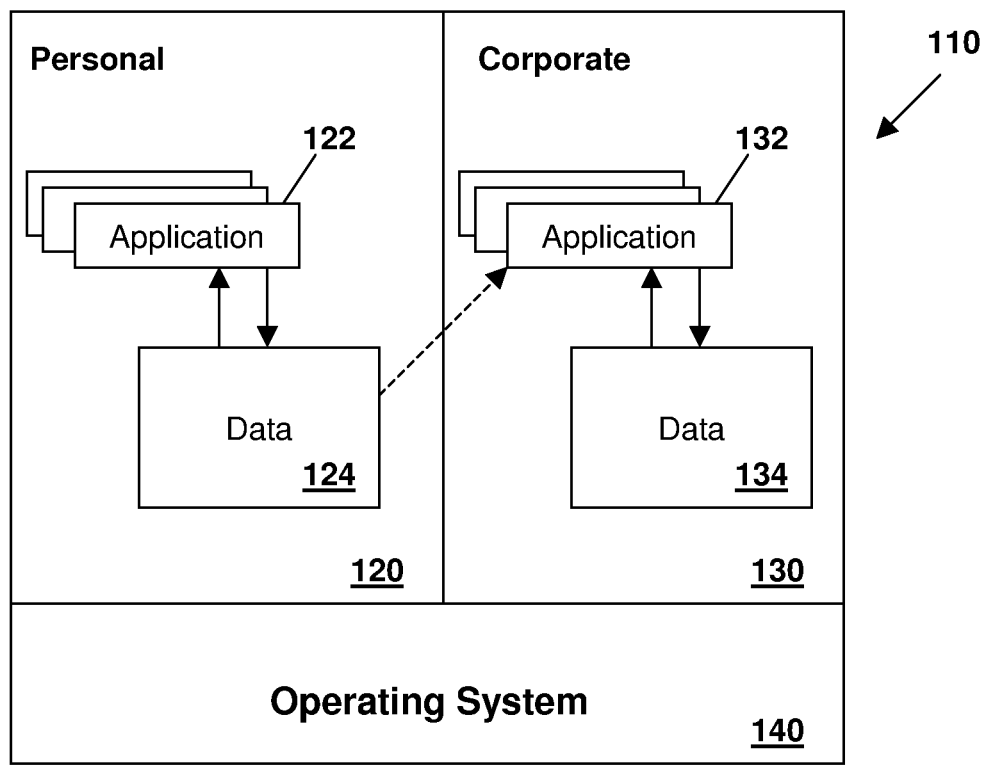
FIG. 1 is a block diagram showing application and data memory on a mobile device.

Reference is now made to FIG. 1, which shows a block diagram of the memory 110 of a mobile device. The memory is configured to store applications and application data, such combination of stored applications and data being referred to herein as an application space. The memory 110 is divided into a personal space 120 and a corporate space 130 in the example of FIG. 1.

Corporate space 130 generally comprises a portion of memory on the mobile device segregated for data, applications, or both, which may be considered sensitive to a business, corporation, enterprise, government, non-profit organization, a user of the device or any other entity setting an information technology policy for the computing device.

Personal space 120 generally comprises a portion of memory segregated for "personal" applications and data, where such applications or data may be considered outside of or separate from an information technology policy.

Within personal space 120, a plurality of applications 122 can communicate with data 124 that is considered to be personal data.

Similarly, in corporate space 130, a plurality of corporate applications 132 communicate with corporate data 134.

By segregating corporate applications from personal applications and data associated with each, corporate IT policies can be implemented on the device for the corporate data, thereby protecting the data, while still allowing for personal applications and personal data on the device. This provides for more flexibility for a user and a better user experience.

Operating system 140 enforces the segregation of the data as described in more detail below.

The designation of each application as either a personal application or a corporate application may be done in several ways. In one embodiment, a corporate IT policy can be set for the loading of applications onto the device, where certain specified applications are designated by the IT policy to be corporate applications. Other applications that are not within the list of corporate applications could be considered, by default, to be personal applications. In other embodiments, a user, administrator, carrier or other entity can use a configuration program or a navigation entity (application launcher) to designate the various applications on the device as personal or corporate applications. Further, signatures applied to applications could also be used for the designation. Other examples of the designation of applications as corporate and personal would be apparent to those skilled in the art having the benefit of the present disclosure.

In further embodiments, hybrid applications that might have both personal and corporate uses could be duplicated between the corporate space 130 and the personal space 120. In this way, if a user wants to use a particular application for personal reasons, the user could open the application 122 in the personal space. Conversely, if the user wants to use the same application for corporate purposes, the user could open the application 132 in corporate space 130.

Thus, for example, a Documents To Go™ document editor could be provided for both the personal space and the corporate space, thereby allowing the editing of both personal documents and corporate documents, while maintaining security for corporate data.

In one embodiment, corporate applications 132 could be provided with additional security over personal applications. For example, before a corporate application 132 could be launched, the user may need to enter a password. Further, inactivity timers could be implemented to lock corporate applications after a period of inactivity while leaving personal applications unlocked. A locked application may require a user to initially enter a password to unlock the application and interact with and access data from the application.

The designation of the application may further limit what data that application has access to. Thus, for example, corporate applications may run in their own mode where any data that they write can never be accessed by the personal application. The limitation would be that personal applications 122 are not able to read corporate data 134, nor is a corporate application capable of writing to personal data 124.

Similarly, a personal application may not be able to write to corporate data 134. In some embodiments, corporate applications 132 may not be able to read personal data 124. In other embodiments, corporate applications 132 may be able to read personal data 124.

Corporate data 134 may be encrypted for security. Such encryption and the storing of encryption keys would be known to those in the art having the benefit of the present disclosure.

Corporate data may also have date of deletion policies in effect on the mobile device. Thus, if corporate data is not accessed within a certain time period, it could be wiped out pursuant to a corporate data reaping timeline. For example, if data is not accessed on the mobile or computing device for seven days, the data may be deleted from the mobile device. The user would then need to download the data again if it was required for the mobile device. This may be implemented through tags or data tables associated with the data.

The operating system 140 can enforce the above differentiating rules between corporate space 130 and personal space 120. For example, operating system 140 may implement data access for the various applications 122 and 132, where each application is given a group permission, similar to UNIX group permissions. In other embodiments, other user permission or other permission system may also be used. Data is further designated in files that allow access by certain groups. Thus, operating system 140 may allow corporate data 134 to be accessed only by applications 132 that have group permissions to access such data. Similarly, personal data 124 may be written to or read only by applications 122 based on the group permissions of application 122 with regard to data 124. Applications 132 however do not have group permissions to write to data 124 in one embodiment, as enforced by operating system 140.

As shown by the dotted arrow in FIG. 1, data 124 may have some form of public permissions that would allow applications 132 to read the data 124.

Access to the data may be maintained for other data functionalities to prevent corporate data from being accessed in the personal mode. For example, copy or cut functionality may be managed between the personal mode and corporate mode. Potentially, no cutting or copying would be allowed in the corporate mode of operation by corporate applications 132.

In other embodiments, cutting and copying may be allowed between corporate applications but may be restricted when trying to paste outside corporate mode. As will be appreciated, this could again be managed by UNIX group permission type model using operating system 140. When cutting or copying various text or images, or other data, a new data file is created which could have group permissions that would restrict where the pasting of that file is allowed to occur. Thus, when using a personal application, if trying to paste corporate data, an error might be returned, or the paste operation may simply not function.

In one embodiment, corporate data 134 may be provided to a device based on a secure connection with the corporate network. For example, this may be done through a virtual private network or other secure connection to an enterprise server.

Further, in one embodiment, the memory 110 may be located on a mobile device. In this case, the mobile device may have a pre-established secure connection with an enterprise server.

Figure 2:
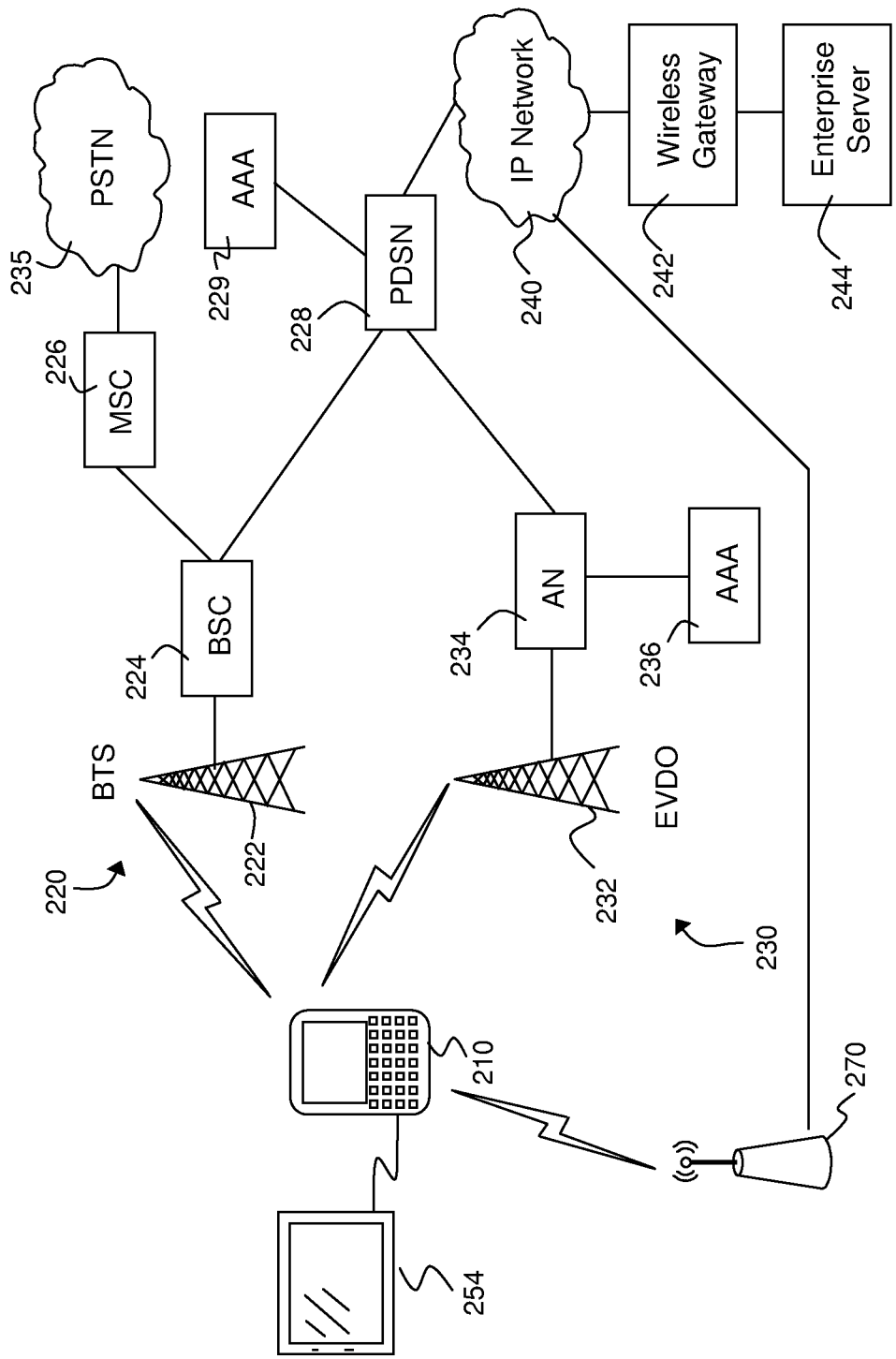
FIG. 2 is a system architecture diagram for a mobile device.

One system architecture which provides secure access to an enterprise server is shown with regard to FIG. 2. The architecture of FIG. 2 is however not meant to be limiting and other system architectures are possible.

Reference is now made to FIG. 2, which shows a block diagram of an example wireless data network in accordance with the present disclosure and with which the various embodiments of the methods of the instant disclosure may cooperate. FIG. 2 shows a block diagram of a mobile device 210 and example Code Division Multiple Access (CDMA) 1× network 220, an example Evolution Data Only (EVDO) network 230, a public switched telephone network (PSTN)

235, a data network 240, wireless gateway 242 and enterprise server 244. This is shown merely as an example, and other network architectures, such as Global System for Mobile (GSM), GSM Packet Radio Service (GPRS), Universal Mobile Telecommunications Service (UMTS), Long Term Evolution (LTE), LTE Advanced (LTE-A), High Speed Downlink Packet Access (HSDPA), WiFi, WiMAX, among others, are possible.

The mobile device 210 may comprise a two-way communication device having data and voice communication capabilities. FIG. 2 further shows an access point 270 for use with an alternative data connection such as a WiFi or WiMAX connection.

CDMA network 220 is comprised of a base transceiver station (BTS) 222 and a base station controller (BSC) 224. Base station controller 224 communicates with a mobile switching centre 226 which, as will be appreciated, is a circuit switched only component communicating with PSTN 235. Base station controller 224 further communicates with a packet data serving node (PDSN) 228 which is a packet switched only component. PDSN 228 further communicates with IP network 240.

EVDO network 230 contains an EVDO sector 232 which communicates with access node (AN) 234. Since the EVDO network 230 is a data only network, access node 234 communicates only with PDSN 228 and not with any circuit switch components.

An authentication, authorization and accounting node 236 is associated with AN 234, and a similar node 229 is associated with PDSN 228.

Operationally, mobile device 210 communicates wirelessly with CDMA network 220 using BTS 222 and BSC 224 to gain access to the CDMA 1× network.

Mobile device 210 sends and receives both data and voice services through CDMA network 220 until an EVDO network connection with established, at which point data can be transmitted over the EVDO network connection.

Further, mobile device 210 can be connected to a computing device 254 such as a tablet for a variety of reasons, some of which are provided below. The connection may be through various means such as a Universal Serial Bus (USB) or other serial port, or by short range wireless communications with a computing device 254. Computing device 254 can then gain access to data network 240 and to enterprise server 244 through EVDO network 230 or CDMA network 220 using mobile device 210.

Mobile device 210 may further have capabilities to communicate through access point 270 using, for example, WiFi. Access point 270 connects to a data network 240 and thus access to wireless gateway 242 and enterprise server 244 are possible through access point 270

In one embodiment, enterprise server 244 could provide both the IT policies for the mobile device 210 and also provide access to a permanent store of the corporate data which can be accessed by mobile device 210.

As will be appreciated by those skilled in the art having the benefit of the present disclosure, the embodiment of FIG. 2 is merely an example and other networks models are possible for mobile device 210 to connect to enterprise server 244. The embodiment of FIG. 2 is not meant to be limiting to any particular network architecture.

Further, mobile device 210 may not be a dual mode or multi mode device that allows connection to WiFi. In this case, the WiFi connection to access point 270 would be removed from the embodiment of FIG. 2 and all communication may proceed over the cellular network through the base station 222 or 232. In other embodiments, mobile device 210 may only have access through an access point 270 and thus the cellular network would be removed from FIG. 2. Other possibilities would be apparent to those skilled in the art having the benefit of the present disclosure.

Computing device 254, may, in some embodiments, comprise a personal computing device. For example, computing device 254 may comprise a tablet computer. The user may further wish to use computing device 254 for corporate functions. However, for security reasons, the corporate IT department may not consider the computing device 254 to be a secure destination for data, since it is a personal device.

Figure 3:
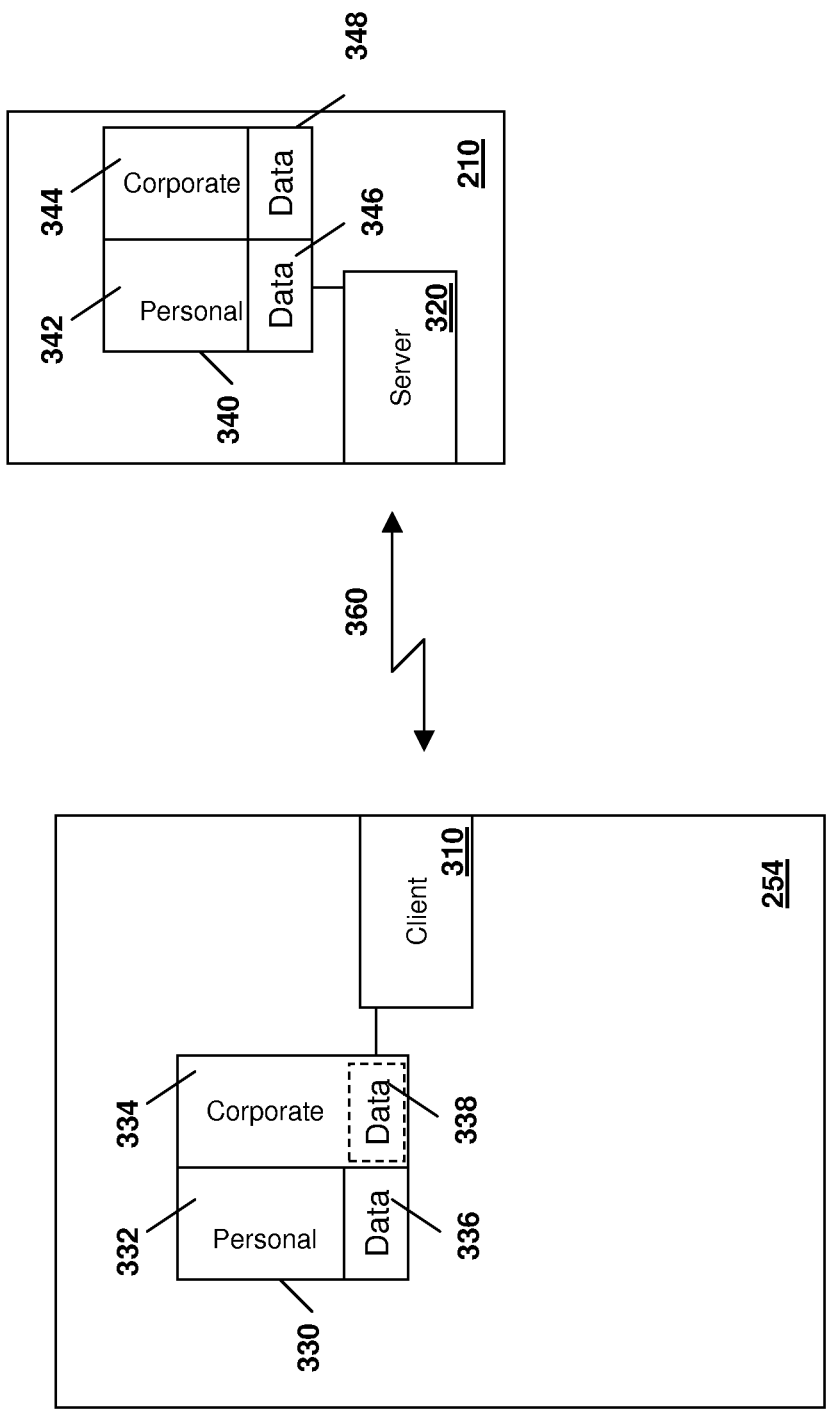
FIG. 3 is a block diagram showing the connection of a corporate device to a personal device.

In order to overcome this, one solution would be to connect the non-secure computing device 254 to the secure (IT trusted) mobile device 210. Reference is now made to FIG. 3.

In FIG. 3, the secure device is mobile device 210. However, this is merely an example and other possibilities for secure mobile devices exist.

The unsecured computing device is computing device 254.

In order to run corporate data on computing device 254, a client 310 may be provided on the computing device 254. Client 310 communicates with a server 320 on the secure mobile device 210 to obtain corporate data.

Further, the computing device 254 may include memory 330, which has a corporate space 334 for storing corporate applications that may be run on computing device 254. Computing device 254 may also have a personal space 332 within memory 330.

As seen in the example of FIG. 3, the personal space contains applications 332 which may access data 336. However, in some embodiments no similar data exists for corporate applications 334.

In an alternative embodiment, corporate space 334 could have data 338 which could be regulated by the same corporate policies as data 348 on mobile device 210. Thus, data 338 would be subject to access restrictions to corporate applications, garbage collection, restrictions on copying or cutting, among the other restrictions provided above. The client 310 could provide this functionality.

On mobile device 210 the divided modes are similarly provided. In particular, memory 340 contains personal applications 342 and corporate applications 344. This is similar to the embodiments described above with regard to FIG. 1.

Each of personal application space 332 and corporate application space 334 has access to a separate data area, namely data 346 for personal applications 342 and data 348 for corporate applications 344. In this way, data 348 cannot be accessed by personal applications 342.

In an alternative embodiment, mobile device 210 may be considered to be a corporate device. In this case, application space 340 would only have corporate applications 344 and corporate data 348. Thus, all information stored on mobile device 210 would be considered to be corporate data, and be accessible only by corporate applications 334.

In order to provide security, a user of computing device 254 may start an application as a corporate application 334. As indicated above, a password may be required to start such applications.

Client 310 recognizes that a corporate application 334 is running and can communicate with server 320 to indicate that corporate data can be provided. In this way server 320 can access the corporate data that is either in data storage 348 or the corporate data can be obtained from an enterprise sever as described above with regard to FIG. 2.

As will be appreciated by those in the art having the benefit of the present disclosure, corporate applications 344 do not necessarily have to be the same as corporate applications 334. For example, with a larger display, computing device 254 may be able to run different applications or variations of applications 344. The corporate data 348 may be the same between the two sets of applications, but could be displayed to the user or used by corporate applications 334 differently than the data 348 would be used on mobile device 210.

The corporate data may then be provided over a connection 360 between mobile device 210 and computing device 254. As will be appreciated by those in the art having the benefit of the present disclosure, connection 360 may comprise any short or long range wired or wireless connection, and examples of such connections include Bluetooth™, USB, Infrared Data Assn (IrDA), WiFi, Radio-frequency identification (RFID), Near Field Communication (NFC) connections, among others.

Communication over link 360 can be secure. That is, corporate data that is passed to computing device 254 or back to mobile device 210 may be encrypted using a key known to both computing device 254 and mobile device 210.

Further, in one embodiment any data that is stored is encrypted. In this case, the encryption key for the stored data may be stored on mobile device 210, thus necessitating the connection in order to decrypt the data on the computing device 254.

Further, it may be a policy that the data is not stored on computing device 254. Thus, except for some possible caching, corporate data will not be stored on device 254. Further, client 310 can ensure that the cache is cleared prior to the corporate application shutting down.

In some embodiments, trusted system components such as navigators to navigate through applications, notification applications, among others will be able to display data from both the corporate and personal sides, giving a merged user interface experience. For example, operating system 140 in FIG. 1 is trusted and given special privileges. Hence, the operating system 140 is able to access both corporate and personal data and merge the data sources into a single display for the user.

From a user interface prospective, corporate applications and personal applications may be distinguished through various means. For example, in a cover flow style user interface, various panes can be designated as personal panes which house personal applications and corporate panes which house corporate applications. The screen color could be different for the two applications. In other embodiments, different fonts could be used for corporate applications or personal applications, or different colors or other delineations could be used to distinguish between corporate applications and personal applications.

While the above is described with regard to a corporate and a personal space, the number of modes or spaces for applications can be further refined. For example, a corporation may consider sales and other information to be more sensitive than employee information. In this regard, sales and such information may be given a separate category from employee information and may be provided with different data storage and segregation, different passwords for the applications that run and display sales information, among other factors. In this case, three modes would exist—personal, corporate employees, and corporate sales.

Further, the above could be expanded to have a plurality of different modes or application spaces with each one being separated and access to each of the plurality of application spaces and the data associated therewith governed by the operating system. The present disclosure is not meant to be limited to any particular number of modes.

Figure 4:
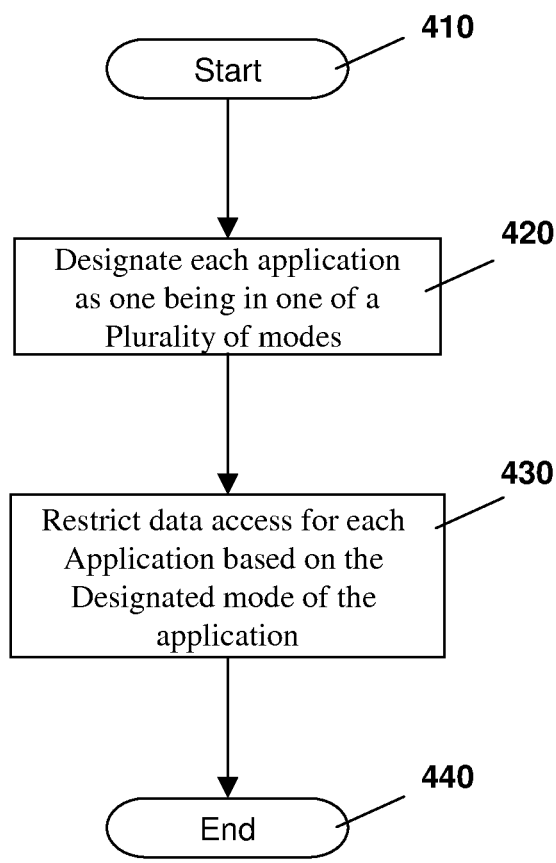
FIG. 4 is a flow diagram showing an example method in accordance with the present disclosure.

FIG. 4 provides a flow diagram showing a method to designate each application as being in one of a plurality of modes and restricting data access for each application based on the mode of the application. Specifically, FIG. 4 provides a flow chart which starts at block 410 and proceeds to block 420. In block 420 a mobile device designates each application as being in one of a plurality of modes.

The process then proceeds to block 430 in which data access is restricted for applications based on the designated mode of the application.

The process then proceeds to block 440 and ends.

Figure 5:
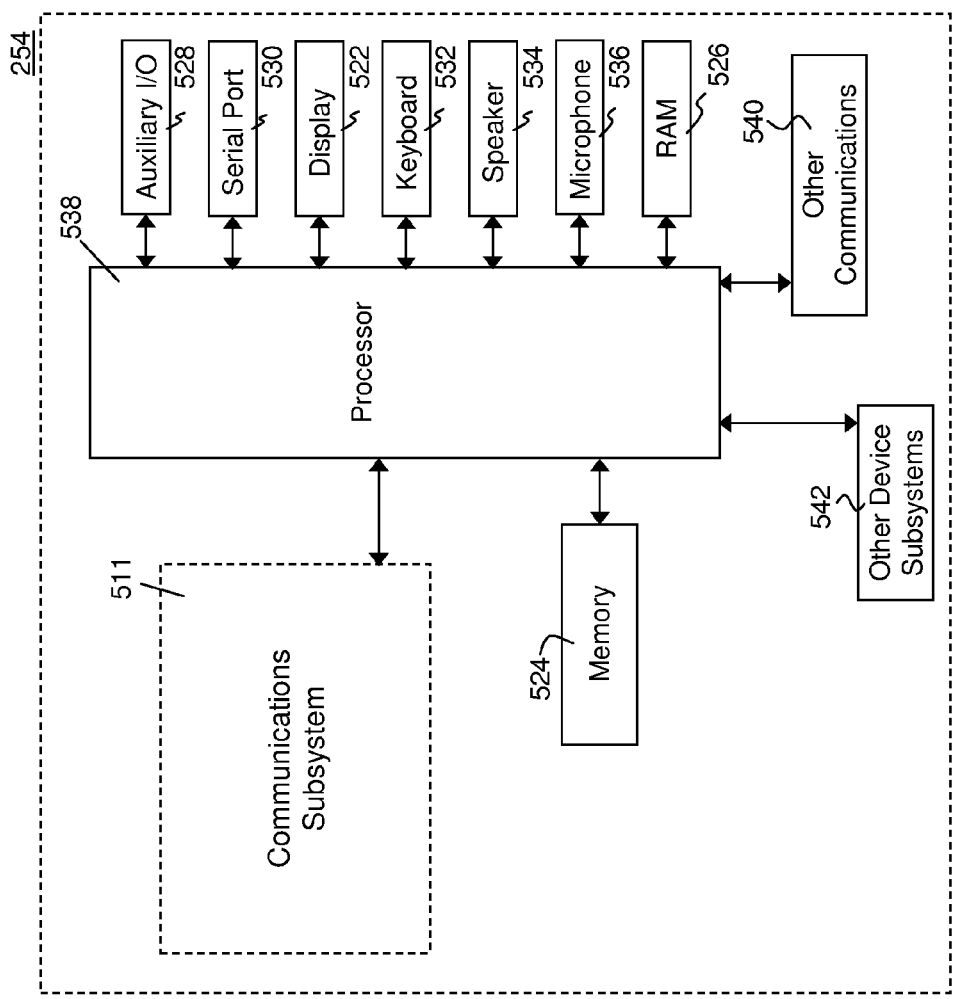
FIG. 5 is a block diagram showing an example computing device.

Reference is now made to FIG. 5, which shows a simplified diagram of a computing device 254. Computing device 254 may comprise a tablet, mobile device, personal computer, laptop computer, among others. The embodiment of FIG. 5 is however not meant to be limiting and other devices could be used.

Computing device 254 generally includes a processor 538, which controls the overall operation of the device. Processor 538 interacts with device subsystems such as the display 522, memory 524, auxiliary input/output (I/O) subsystems 528, serial port 530, one or more keyboards or keypads 532, where keyboard or keypad 532 may comprise a physical keyboard or a virtual keyboard or both, one or more speakers 534, microphone 536, other communication subsystem 540 such as a short-range communications subsystem, including Bluetooth and near field communications, and any other device subsystems generally designated as 542. Serial port 530 could include a USB port or other port.

Memory 524 may be segregated as illustrated in FIGS. 1 and 3, described above. Operating system software used by the processor 538 may be stored in memory 524. The operating system, specific device applications, or parts thereof, may be temporarily loaded into a volatile memory such as RAM 526.

Applications may be loaded onto the device and associated with a mode. Such applications and data for the application may be stored in memory associated with the mode.

In some embodiments, computing device 254 may optionally include a communications subsystem 511 capable of communication with a data access point. Such data access point may include a cellular network or WiFi or WiMAX network, among others. In further embodiments, computing device 254 may be capable of voice communications.

Figure 6:
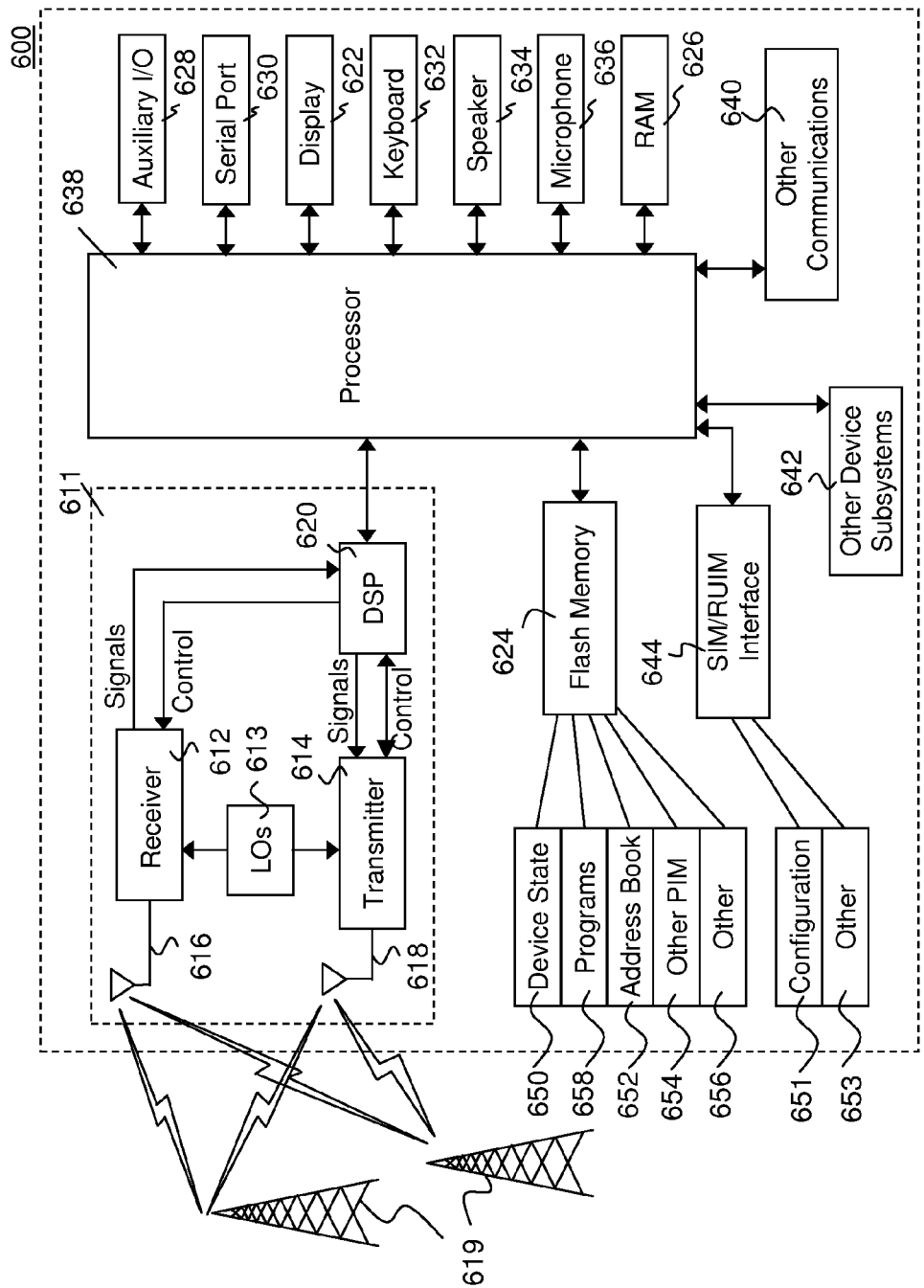
FIG. 6 is a block diagram showing an example mobile device capable of being used with the present disclosure.

Similarly, in one embodiment, device 210 could be a mobile device. One such example mobile device is illustrated below with reference to FIG. 6. The mobile device of FIG. 6 is however not meant to be limiting and other mobile devices could also be used.

Mobile device 600 may comprise a two-way wireless communication device having any of voice capabilities, data communication capabilities, or both. Mobile device 600 generally has the capability to communicate with other devices or computer systems. Depending on the exact functionality provided, the mobile device may be referred to as a data messaging device, a two-way pager, a wireless e-mail device, a cellular telephone with data messaging capabilities, a wireless Internet appliance, a wireless device, a user equipment, a tablet, or a data communication device, as examples.

Where mobile device 600 is enabled for two-way communication, it may incorporate a communication subsystem 611, including both a receiver 612 and a transmitter 614, as well as associated components such as one or more antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate.

Network access requirements will also vary depending upon the type of network 619. In some networks, network access is associated with a subscriber or user of mobile device 600. A mobile device may require a removable user identity module (RUIM) or a subscriber identity module (SIM) card in order to operate on the network. The SIM/RUIM interface 644 may be similar to a card-slot into which a SIM/RUIM card can be inserted and ejected like a diskette or PCMCIA card. The SIM/RUIM card can have memory and hold many key configuration 651, and other information 653 such as identification, and subscriber related information.

When required network registration or activation procedures have been completed, mobile device 600 may send and receive communication signals over the network 619. As illustrated in FIG. 6, network 619 can consist of multiple base stations communicating with the mobile device. For example, in a hybrid CDMA 1× EVDO system, a CDMA base station and an EVDO base station communicate with the mobile station and the mobile device is connected to both simultaneously. In other systems such as Long Term Evolution (LTE) or Long Term Evolution Advanced (LTE-A), multiple base stations may be connected to for increased data throughput. Other systems such as GSM, GPRS, UMTS, HSDPA, among others are possible and the present disclosure is not limited to any particular cellular technology.

Signals received by antenna 616 through communication network 619 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile device 600 generally includes a processor 638 which controls the overall operation of the device. Communication functions, including data and voice communications, are performed through communication subsystem 611. Processor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art having the benefit of the present disclosure.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list, among other applications.

Operating system software used by the processor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. The applications may be segregated based on the mode or category they fall into. Memory 624 may further provide security for corporate data and if some applications are locked while others are not.

Processor 638, in addition to its operating system functions, may enable execution of software applications on the mobile device. A predetermined set of applications that control basic operations, including data or voice communication applications for example, will normally be installed on mobile device 600 during manufacturing. Other applications could be installed subsequently or dynamically.

Applications and software, such as those described above with regard to FIGS. 1 and 3 may be stored on any computer readable storage medium. The computer readable storage medium may be a tangible or intransitory/non-transitory medium such as optical (e.g., CD, DVD, etc.), magnetic (e.g., tape) or other memory known in the art.

One example software application may be a personal information manager (PIM) application having the ability to organize and manage data items relating to the user of the mobile device such as, but not limited to, e-mail, calendar events, voice mails, appointments, and task items. Further applications, including, but not limited to, a media player, camera, messenger, mail, calendar, address book, web browser, social networking, game, electronic book reader, map, or other application may also be loaded onto the mobile device 600 through the network 619, an auxiliary I/O subsystem 628, serial port 630, short-range communications subsystem 640 or any other suitable subsystem 642, and installed by a user in the RAM 626 or a non-volatile store (not shown) for execution by the processor 638. Such flexibility in application installation increases the functionality of the device and may provide enhanced on-device functions, communication-related functions, or both. For example, secure communication applications may enable electronic commerce functions and other such financial transactions to be performed using the mobile device 600.

In a data communication mode, a received signal such as a text message or web page download will be processed by the communication subsystem 611 and input to the processor 638, which may further process the received signal for output to the display 622, or alternatively to an auxiliary I/O device 628.

A user of mobile device 600 may also compose data items such as email messages for example, using a keyboard 632, which may comprise a virtual or physical keyboard or both, and may include a complete alphanumeric keyboard or telephone-type keypad, among others, in conjunction with the display 622 and possibly an auxiliary I/O device 628. Such composed items may then be transmitted over a communication network through the communication subsystem 611.

For voice communications, overall operation of mobile device 600 is similar, except that received signals would typically be output to one or more speakers 634 and signals for transmission would be generated by a microphone 636. Alternative voice or audio I/O subsystems, such as a voice message recording subsystem, may also be implemented on mobile device 600. Although voice or audio signal output may be accomplished primarily through the one or more speakers 634, display 622 may also be used to provide an indication of the identity of a calling party, the duration of a voice call, or other voice call related information for example.

Serial port 630 in FIG. 6 would normally be implemented in a personal digital assistant (PDA)-type mobile device for which synchronization with a user's desktop computer (not shown) may be desirable, but is an optional device component. Such a port 630 would enable a user to set preferences through an external device or software application and would extend the capabilities of mobile device 600 by providing for information or software downloads to mobile device 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the mobile device to a computer to act as a modem.

Other communications subsystems 640, such as a short-range communications subsystem, are further optional components which may provide for communication between mobile device 600 and different systems or devices, which need not necessarily be similar devices. For example, the subsystem 640 may include an infrared device and associated circuits and components, near field communications (NFC) or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A system comprising:
a first device configured to receive restricted data; and
a second device;
wherein the first device includes:
a first processor; and
first memory;
wherein the first processor and first memory cooperate to:
restrict data on the first device to be accessible by only a subset of applications based on a designated mode for an application; and
enable server software for controlling access to the restricted data; and
wherein the second device includes:
a second processor; and
second memory;
wherein the second processor and second memory cooperate to:
associate a subset of applications on the second device as associated with a trusted mode, the subset of applications associated with the trusted mode configured to use both restricted and unrestricted data; and
enable a client on the second device capable of both communicating with the server software on the first device and providing policy management on the second device to restrict access to the restricted data on the first device to the subset of applications on the second device associated with the trusted mode,
wherein access to restricted data by applications on the second device is provided only while a connection between the first device and second device is maintained.

2. The system of claim 1, wherein the second device comprises a tablet.

3. The system of claim 1, wherein the first device comprises a mobile device.

4. The system of claim 1, wherein designated modes comprise a personal mode and a corporate mode.

5. The system of claim 1, wherein the restricting access comprises adding a group permission to the data and providing each application with access based on the group permission.

6. The system of claim 1, wherein restricted data is stored on the second device in an encrypted format.

7. The system of claim 6, wherein a decryption key for decrypting the encrypted data stored on the second device is stored on the first device, the decryption key being available to the second device only while the connection between the first device and second device is maintained.

8. The system of claim 1, wherein access restrictions on the second device include a password requirement to start the applications associated with the trusted mode.

9. The system of claim 1, wherein the restricted data is stored only on the first device and is provided to the second device only when the connection between the first device and second device is maintained.

10. The system of claim 9, wherein the client is configured to clear restricted data from a cache on the second device upon an exit of an application associated with the trusted mode.

11. The system of claim 1, wherein the applications associated with the trusted mode are prohibited from writing restricted data to applications not associated with the trusted mode.

12. The system of claim 1, wherein the connection between the first device and second device is at least one of a Bluetooth connection, a universal serial bus connection, a WiFi connection, a near field communications connection, a radio frequency identification connection, an infrared data association connection, or a cellular connection.

13. The system of claim 1, wherein communication over the connection between the first device and second device is encrypted.

14. The system of claim 1, wherein the first device further includes a subset of applications associated with the trusted mode and configured to read both restricted data and unrestricted data.

15. The system of claim 14, wherein the subset of applications associated with the trusted mode on the first device differs from the subset of applications associated with the trusted mode on the second device.

16. A method comprising:
at a first device configured to receive restricted data:
restricting data on the first device to be accessible by only a subset of applications based on a designated mode for an application; and
enabling server software for controlling access to the restricted data; and
at a second device:
associating a subset of applications on the second device as associated with a trusted mode, the subset of applications associated with the trusted mode configured to use both restricted and unrestricted data; and
enabling a client on the second device capable of both communicating with the server software on the first device and providing policy management on the second device to restrict access to the restricted data on the first device to the subset of applications on the second device associated with the trusted mode,
wherein access to restricted data by applications on the second device is provided only while a connection between the first device and second device is maintained.

17. The method of claim 16, further comprising storing, on the second device, restricted data in an encrypted format, wherein a decryption key for decrypting the encrypted data stored on the second device is stored on the first device, the decryption key being available to the second device only while the connection between the first device and second device is maintained.

18. The method of claim 16, further comprising storing the restricted data only on the first device and providing the restricted data to the second device only when the connection between the first device and second device is maintained.

19. The method of claim 18, further comprising clearing restricted data from a cache on the second device upon an exit of an application associated with the trusted mode.

20. A non-transitory computer readable medium for storing program instruction which, when executed by a first processor on a first computing device are configured to:
restrict data on the first device to be accessible by only a subset of applications based on a designated mode for an application; and
enable server software for controlling access to the restricted data, the non-transitory computer readable medium further storing program instruction which, when executed by a second processor on a second computing device are configured to:
associate a subset of applications on the second device as associated with a trusted mode, the subset of applications associated with the trusted mode configured to use both restricted and unrestricted data; and
enable a client on the second device capable of both communicating with the server software on the first device and providing policy management on the second device to restrict access to the restricted data on the first device to the subset of applications on the second device associated with the trusted mode,
wherein the program instructions provide access to restricted data by applications on the second device only while a connection between the first device and second device is maintained.

* * * * *